United States Patent [19]
Andrea et al.

[11] Patent Number: 5,715,321
[45] Date of Patent: Feb. 3, 1998

[54] NOISE CANCELLATION HEADSET FOR USE WITH STAND OR WORN ON EAR

[75] Inventors: Douglas Andrea, Old Brookville; Martin Topf, Brooklyn, both of N.Y.

[73] Assignee: Andrea Electronics Coporation, Long Island City, N.Y.

[21] Appl. No.: 535,353

[22] Filed: Oct. 23, 1995

Related U.S. Application Data

[63] Continuation-in-part of Ser. No. 32,594, Dec. 21, 1994, Pat. No. Des. 371,133, and a continuation-in-part of Ser. No. 485,047, Jun. 7, 1995, which is a continuation-in-part of Ser. No. 339,126, Nov. 14, 1994, which is a continuation-in-part of Ser. No. 968,180, Oct. 29, 1992, Pat. No. 5,381,473.

[51] Int. Cl.$^6$ ..................................................... H04R 3/00
[52] U.S. Cl. .................. 381/92; 381/71.6; 381/74.7; 381/183; 381/187; 379/430
[58] Field of Search ........................... 381/94, 93, 72, 381/71, 183, 188, 69, 68.7, 187; 379/430, 431

[56] References Cited

U.S. PATENT DOCUMENTS

| | | | |
|---|---|---|---|
| D. 323,753 | 2/1992 | Johnston | D6/466 |
| 2,972,018 | 2/1961 | Hawley et al. | |
| 3,098,121 | 7/1963 | Wadsworth | |
| 3,394,226 | 7/1968 | Andrews, Jr. | 381/72 |
| 3,654,404 | 4/1972 | Hutchings | 381/187 |
| 3,890,474 | 6/1975 | Glicksberg | 179/107 E |
| 4,334,740 | 6/1982 | Wray | |
| 4,672,674 | 6/1987 | Clough | 381/71 |
| 4,833,719 | 5/1989 | Carme et al. | |
| 4,882,745 | 11/1989 | Silver | 381/183 |
| 4,932,052 | 6/1990 | Lo | 381/187 |
| 4,972,468 | 11/1990 | Murase et al. | 381/187 |
| 4,985,925 | 1/1991 | Langberg et al. | |
| 5,001,763 | 3/1991 | Moseley | |
| 5,091,954 | 2/1992 | Sasaki et al. | |
| 5,117,461 | 5/1992 | Moseley | |
| 5,125,032 | 6/1992 | Meister et al. | |
| 5,134,659 | 7/1992 | Moseley | |
| 5,138,663 | 8/1992 | Moseley | |
| 5,138,664 | 8/1992 | Kimura et al. | |
| 5,177,784 | 1/1993 | Hu | 381/187 |
| 5,210,792 | 5/1993 | Kajihara | 381/187 |
| 5,260,997 | 11/1993 | Gattey et al. | 379/430 |
| 5,276,740 | 1/1994 | Inanaga et al. | |
| 5,327,506 | 7/1994 | Stites, III | |
| 5,381,486 | 1/1995 | Ludeke | 379/430 |

(List continued on next page.)

FOREIGN PATENT DOCUMENTS

| | | | |
|---|---|---|---|
| 3719963 | 3/1988 | Germany | G10K 11/16 |
| 1314098 | 12/1989 | Japan | |
| 3169199 | 7/1991 | Japan | |
| 3231599 | 10/1991 | Japan | |
| 0913244 | 12/1962 | United Kingdom | 381/187 |
| 1160431 | 8/1969 | United Kingdom | |
| 1289993 | 9/1972 | United Kingdom | |
| 1378294 | 12/1974 | United Kingdom | |
| 9205538 | 4/1992 | WIPO | |

*Primary Examiner*—Curtis Kuntz
*Assistant Examiner*—Xu Mei
*Attorney, Agent, or Firm*—Thomas J. Kowalski

[57] ABSTRACT

A self-supporting headset worn on the ear of a user without a headband or placed in a stand as a desk-top microphone system by a switch-function installed in the headset. The headset includes a housing which accommodates a receiver, an arcuate earband connected by a spring to the housing and a pivotally connected boom microphone which extends from the housing to near the lips of a user. The earband can have a shape substantially corresponding to human ear structure for placement behind the ear of the user. The arcuate housing is placed over the entire outer ear to transmit audio signals without any need for an ear tube. An earband member can have a female member on the bottom surface so as to connect a member to mate with a male member located on the stand, to thereby secure the headset on the stand. The headset can be equipped with noise cancellation technology to remove background noise for optional use on with telephones, computers, or any the like.

24 Claims, 9 Drawing Sheets

U.S. PATENT DOCUMENTS

| | | | |
|---|---|---|---|
| 5,402,497 | 3/1995 | Nishimoto et al. | 381/95 |
| 5,414,769 | 5/1995 | Gattey et al. | 379/430 |
| 5,446,788 | 8/1995 | Lucey et al. | 379/430 |
| 5,448,637 | 9/1995 | Yamaguchi et al. | 379/430 |
| 5,450,496 | 9/1995 | Burris | 381/183 |
| 5,533,122 | 7/1996 | Gattey et al. | 379/430 |
| 5,613,222 | 3/1997 | Guenther | 381/183 |
| 5,673,325 | 9/1997 | Andrea et al. | 381/92 |

NOISE CANCELLATION HEADSET FOR USE WITH STAND OR WORN ON EAR

RELATED APPLICATIONS

This application is a continuation-in-part of pending U.S. application Ser. No. 08/485,047, filed Jun. 7, 1995, which is a continuation-in-part of U.S. application Ser. No. 08/339,126 filed Nov. 14, 1994, which is a continuation-in-part of U.S. application Ser. No. 968,180, filed Oct. 29, 1992, now U.S. Pat. No. 5,381,473, issued on Jan. 10, 1995; and, this application is also a continuation-in-part of design application Ser. No. 29/032,594, filed Dec. 21, 1994, now U.S. Pat. No. D371,133. Reference is also made to U.S. Pat. No. 5,251,263, issued Oct. 5, 1993. Each of the foregoing applications and patents are hereby incorporated herein by reference.

FIELD OF THE INVENTION

This invention relates to a headset. The headset enables the wearer to execute multimedia and speech recognition applications for telephone, computer, computer telephone, or dictation, and like uses. The headset preferably is lightweight. The headset is preferably self-supporting. The headset preferably contains at least one microphone means for canceling background noise and at least one receiver means for transmitting audio signals to the ear the wearer. The headset is preferably capable of being worn on one ear (left or right) of the wearer, without a head-band. The headset is preferably capable of attaching to a stand to allow "hands-free" and/or "wire-free" access to communication systems, e.g., the headset can be a "hands-free" handset.

More particularly, the invention relates to a headset preferably comprising a housing having at least one receiver means for placing over a left or right auditory canal of the user. The headset also comprises an earband structure attached to the housing, preferably by spring means. The earband structure is for placing behind the ear, and is preferably arcuate in shape. Preferably, the earband structure has a movable earband member at a lower portion, towards the or at end opposite the attachment to the housing. The movable earband member is preferably tear drop shaped, for placement behind the ear. The headset further comprises a pivotal boom microphone containing at least one, preferably two, microphone(s) for transmitting the user's voice, preferably with the voice substantially free of background noise. The earband structure is also preferably contour shaped for better contact with surfaces behind the ear, for instance, the earband structure can have a shape on each side which substantially matingly fits surfaces behind the ear (e.g., to matingly fit behind the auricle, e.g., behind the fossa of helix and/or anti-helix, and/or over the mastoid bone protruding from the skull behind the ear, i.e., between the back of the ear and the skull). The earband member can also serve to support the headset in the stand so that the headset acts as a microphone system for far-field speech and sound recording by the installation of a simple electronic switching means in the headset.

BACKGROUND OF THE INVENTION

Some prior art headsets have included various intermediate supporting structures for supporting the headset in cooperative relationship with the ear and mouth of the user. Such structures have included headbands and means for attachment to the temple of eyeglasses. Prior art headsets suffer from several disadvantages.

One of the problems of prior art headsets relates to headbands per se, which are necessary with most headset designs to provide the needed support. Headbands are inherently bulky, add to the cost of the headset, and must be maintained and stored. For some applications as, for example, when other heavy headgear must also be worn, headbands are frequently inconvenient or unsuitable. Moreover, to a large number of hairdress-conscious women operators, headbands of any type are anathema because of their bulk and tendency to snag and disturb the hair.

Headsets have evolved from bulky, uncomfortable headphones which clamped to the cranium, to light-weight miniature headsets which clip to the ear or to eyeglasses. In the state of the art, the transducers are placed in a housing which is clipped behind the ear, with tubes leading from the transducers to the mouth and auditory meatus of the operator. Alternatively, the housing is clamped to the temple bar of a head bracket which resembles an eyeglass frame, with the same sort of tubes used to conduct the sound to and from the transducers.

Other methods of avoiding headband support include suspending the set from a loop placed around the ear, similar to eyeglass frames, or suspending the set from the eyeglass frame itself. The eyeglass clip method, however, tends to shift the optical axis, and is limited in any case to persons who wear glasses. The over-ear loop lacks stability and also disturbs the optical axis if glasses are also worn. These structures have been rather cumbersome. In practice, the eyeglass frame head bracket is uncomfortable and unwieldy. The housing disposed behind the ear tends to hang on the helix of the ear in an annoying fashion, and the tube extending into the meatus is also irritating. In both cases, the headsets must be manufactured in left and right ear models.

Another means for avoiding headband support on is ear molds for supporting the headset from inside the ear. This necessitates fitting of the ear mold to individual users. Headsets without the headband have not been adopted in any extensive commercial practice primarily because such headband-free headsets do not adapt to average ear variations and, therefore, have not closely or properly fit and have easily fallen from the ear.

An increasing concern for operator comfort as well as equipment performance has prompted recent efforts to improve radio and telephone headsets. Broadly, the two prime causes of wearer discomfort are the weight and bulk of the set, and the distribution of whatever weight is involved. Significant weight and size reductions are achieved by replacing the heavy magnetic core receivers and carbon-type transmitters with miniature balanced armature transducers of the type routinely used in hearing aid devices. These transducers have been used with acoustic pick-up tubes, and this expedient has also been employed in the telephone headset art to reduce weight.

Another general problem of prior headsets involves the support or suspension mechanisms for positioning the headset in accordance with the wearer's mouth-ear geometry. An aspect of this problem is that conventional supports in headset designs employ very complicated and bulky adjustment features. Simplified support designs have sacrificed at least to some extent adjustability. Further, earlier support designs did not adequately take into account certain wearer preferences, particularly of telephone operators, which include location of the supportive pressure, manner of putting on and removing the headset and movement of the transmitter independently of the receiver.

A further problem of prior headsets, principally one of acoustics but bearing importantly on operator comfort, relates to the receiver-to-ear seal. Tight seals are desirable from the transmission standpoint, but are achieved in today's headsets with considerable sacrifice in operator comfort.

Thus, the prior art has failed to provide an adjustable communication headset. The prior art has not provided a computer headset which has good fidelity in both transmission and reception in a noisy environment, and is so unobtrusive when worn as to constitute little or no hindrance or distraction to the user. More particular, the prior art has failed to provide a relatively light-weight, low cost headset to be worn on either ear of a user, which utilizes, at least one microphone, or a headset which can be a stand-alone far-field microphone system to allow the user a "wire-free" environment.

OBJECTS AND SUMMARY OF THE INVENTION

An object of the present invention is to provide a noise cancellation headset worn on either ear of the user or attached to a stand as a desk-top microphone system for transmitting the user's voice when connected to communication means which addresses the problems associated with the prior art.

More specifically, it is an object of the present invention to provide an adjustable headset which can be comfortably and securely fitted to a wide range of user's ears.

Another object of the present invention is to provide a headset which can be used as a stand alone microphone system when attached to a stand for far-field speech, sound recording, voice dictation and for other speech-driven applications.

It is still another object of the present invention to provide a relatively low-cost headset as aforementioned which is light-weight and less cumbersome than prior headsets.

A yet further object of the present invention is to provide a headset for having a movable boom microphone, allowing the headset to be worn on the left or right ear; and having a receiver housing covering the outer ear, thereby eliminating any need of for an ear tube.

It is yet another object of the present invention to provide a headset readily adaptable to a wide variety of ear geometries by the headset having a earband structure, preferably also having a movable earband member, e.g., by means of a ball and socket joint, to allow for increased stability of the headset to the lower back of the ear lobe.

A still further object of the present invention is to provide a computer headset by mating the earband member, having a female member, into a male member tip of a stand (or the earband having a male member and the stand having a female member) so that the headset acts as a stand-alone desk-top microphone system providing the user with "wire-free" access.

In accordance with an aspect of this invention, there is provided a headset including arcuate housing, provided said housing having at least one receiver means for transmitting audio signals to the ear; arcuate earband member for placement behind the ear; spring means for attaching the earband structure to the housing; boom microphone device having two ends, one end having at least one microphone means for receiving an acoustic signal and for converting said acoustic signal to a microphone signal; and electronic connecting means for transmitting audio signals from and supplying the microphone signal to an external communication system by adapter means.

In another aspect the invention provides arcuate housing for placement over a left or right ear of a wearer, said housing having at least one receiver means for transmitting audio signals to the ear;

arcuate earband structure for placement behind the ear having an earband member, the earband member having a female member;

first pivotal means for securing the earband member to the earband structure;

spring means for attaching the earband structure to the housing;

a boom microphone device having two ends, one end having a first microphone means for receiving a first acoustic sound composed of speech originating from the wearer and background noise and for converting said first acoustic sound to a first microphone signal and a second microphone means arranged at a predetermined angle with respect to said first microphone means for receiving a second acoustic sound composed of substantially said background noise and for converting said second acoustic sound to a second microphone signal and the other end having means for connecting the device to the housing;

means for subtracting the second signal from said first signal so as to obtain a signal representing substantially speech;

a second pivotal means for securing the boom microphone device to the housing;

electrical connecting means for transmitting audio signals from and supplying the microphone signal to an external communication system by an adapter means; and a stand having a male member for insertion into the female member of the earband member.

The boom microphone headset without a headband can be used in flight (e.g., helicopter or airplane) or in other settings such as telephones, or voice recognition and/or verification systems or to a computer or in other voice recognition and/or verification systems. The headset placed in the stand with the boom microphone acts as a microphone system utilizing directional microphones such as directional microphones with sidelobes to transmit far-field speech.

Other objects, features and advantages according to the present invention will become apparent from the following detailed description of the illustrated embodiments when read in conjunction with the accompanying drawings in which corresponding components are identified by the same reference numerals.

DETAILED DESCRIPTION

Figure 1:
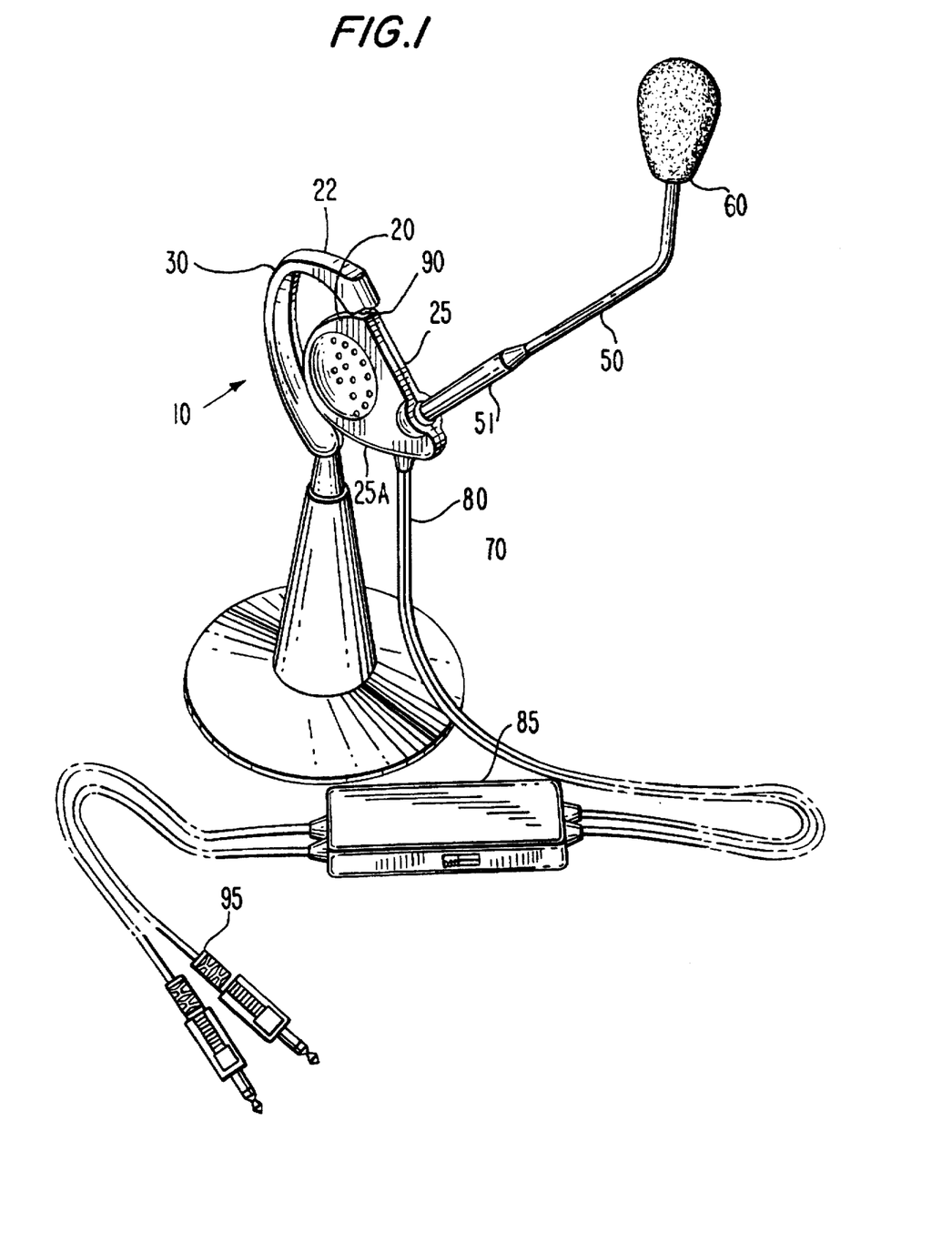
FIG. 1 illustrates the a noise cancellation headset mated into a stand.
Figure 2A:
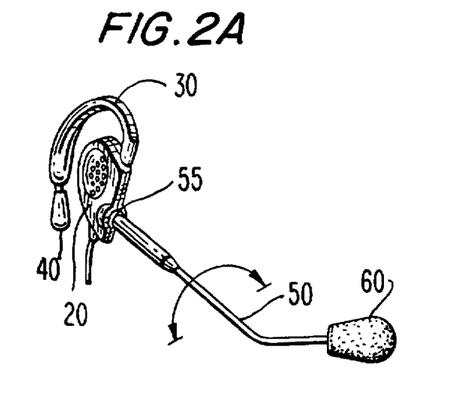
FIG. 2A shows a side view of the rotation of the boom microphone of noise cancellation headset.

FIG. 1 illustrates the noise cancellation headset 10 temporarily affixed to stand 40 in accordance with a preferred embodiment of the present invention. The means to accomplish this mechanical connection of the headset 10 in a stand 40 will be discussed later. As shown therein and with reference to all of the FIGS. 1–10, the noise cancellation headset 10 includes a single arcuate housing 20, having acoustical port holes 22, which comfortably fits over the outer ear for conveying sound directly to the ear as shown in FIG. 2A. The housing 20 is connected by a spring means 90 to an arcuate earband structure 30, preferably having an earband member 40 attached to the earband member 30.

The spring means 90 is preferably covered with a sleeve (not shown), preferably made of molded first plastic or any other support structure to add a more rigid support between the earband structure 30 and housing 20. The arcuate earband structure 30 is preferably contoured to reflect the shape of the back of the ear or the mastoid bone protruding from the skull behind the ear, to comfortably rest on top of the ear and ear lobe for stability of the headset 10. The flexibility and shape of the earband structure 30 ensures a comfortable fit. In the preferred embodiment, the earband member 40 is attached to the earband structure 30 by a ball and socket joint means, which provides an adjustable means to secure the headset to either ear of the user. Either the earband structure or the earband member can have a male member which matingly fits into a female member of the other (and accordingly either the earband structure or the earband member can have a female member which matingly fits into a male member of the other), 30 as to form the preferred joint.

The pivotal connection, the earband member, of the earband structure simultaneously serves at least two purposes, namely to assure a snug and firm fit of the headset to the wearer's ear and to mechanically support the headset in a stand as shown in FIG. 1 by a male member to a mating female member, which connection will be discussed later. A pivotal boom microphone device 50 extending obliquely from the housing 20 having a microphone casing (not shown) at a distal end. The casing houses at least one microphone means, which is preferably covered by a protective medium, such as wind sock 60. The boom microphone device preferably has second sleeve 51 encasing a portion of the boom device 50. The sleeve 51 is mounted within the housing 20 to comprise a ball and joint means 55. The boom microphone device 50 is adapted to convey sound from preferably a plurality of microphones located in the casing at the distal end to the receiver or transducer means (not shown) contained with in the housing 20.

In FIGS. 1 and 2, the boom microphone device 50 is pivotally connected by the ball and socket joint means 55 whereby the sleeve 51 has a male member, the ball, and the housing has the female member, the socket; but alternatively, the male member can protrude from the housing and the female member positioned at the end of the sleeve. This joint means 55 allows the boom microphone device 50 to be rotated for positioning behind the left ear or right ear of a wearer. Thus, when the wearer wears the headset on the left ear with the boom microphone 50 positioned on the left side of the head, the wearer can easily rotate the boom microphone device 50 from 0° to 180° degrees to be at the right side of the head, if the wearer chooses to switch the headset to the right ear. Towards the microphone end, the boom microphone preferably angles approximately 15° to 45°, more preferably about 30°.

Figure 2B:
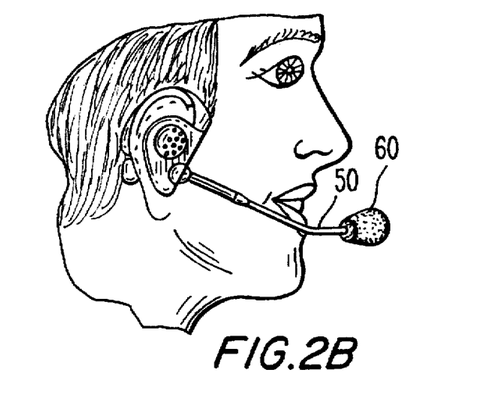
FIG. 2B shows a side view of a user wearing the headset.

Therefore, adjustment before use of the headset 10 consists in arranging the pivotal boom microphone device 50 preferably a distance about 0.25 to 1.0, preferably about 0.75 inches from the lips of the wearer as shown in FIG. 2B. The arcuate earband structure 30 is then placed behind the ear, pivoting the preferred earband member 40 to clamp against the inner portion of the ear lobe. The housing 20 is positioned over the outer ear of the wearer to insure a comfortable fit. The spring means 90 allows the earband structure 30 flexibility to rotate about 360° around the axis of the housing 20. This flexibility provides the user the ability to place the earband structure with the preferred earband member behind the ear and to place the housing with the receiver means over the outer ear as shown in FIG. 2D. Accordingly, the headset 10 preferably has features to help position the boom microphone device 50 in the proper position for reliable voice recognition which include: adjustable earband member 40 to secure the headset to the wearer's ear for stability; and a pivotal boom microphone device (see FIGS. 2A–2D).

As shown in FIG. 1, the electrical connecting means 80 extends from the lower portion of the housing 20. The housing 20 secures the input microphone lead wires (not shown) from the boom microphone device 50 with the output wires from at least one receiver means (not shown) to an in-line module case 85. The signals are transmitted from the cable wiring 80 to the electronic circuitry contained in the module 85 preferably for canceling or reducing background acoustic noise. The inventive headset 10 is designed preferably to be sensitive to distant sound source, especially when utilized in the stand as a desk-top microphone system for uses such as voice dictation. Arbitrary sound fields which emanate from more than a few inches away from the microphone are substantially canceled by up to 30 dB (3200%). This is achieved by the preferred noise cancellation circuitry contained in the electric connection case or in-line module case 85.

Figure 2C:
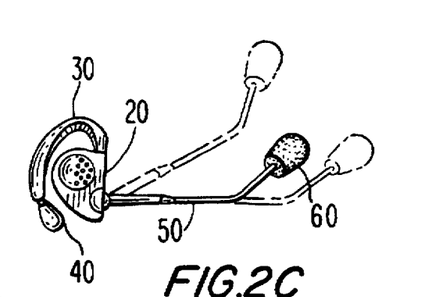
FIG. 2C shows a side view of the pivotally rotation of the boom microphone of the noise cancellation headset.
Figure 2D:
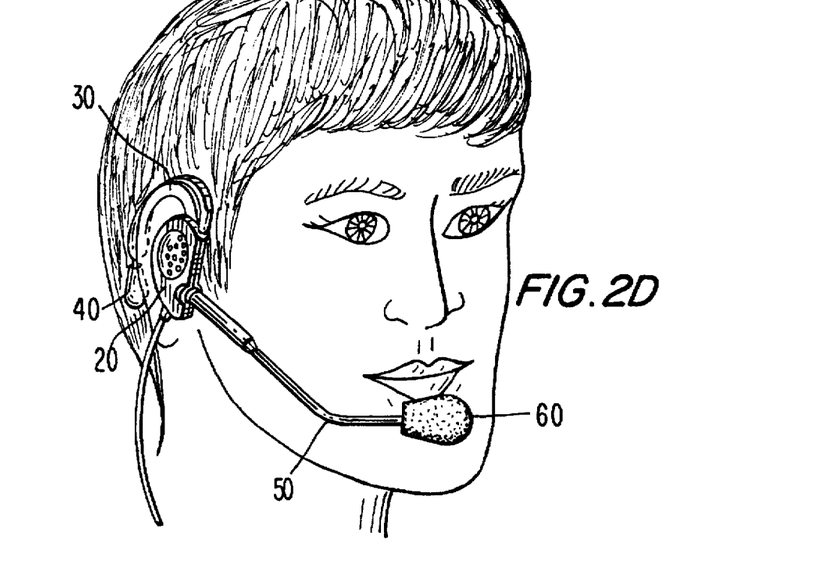
FIG. 2D shows a front view of the user wearing the headset of the present invention.

In FIG. 2A–2C, the single housing 20 is comprised of a flat surface 25 and an arcuate shaped surface 25a. From the lower portion of the flat surface of the housing 20 is provided a socket (not shown) to accommodated a ball (not shown), where the socket is part of the sleeve 51 of the pivotal boom microphone device 50 to allow for rotation. Alternatively, as above-mentioned the housing 20 can accommodate the ball (not shown) and the socket (not shown) would be the sleeve 51, which achieves the same pivotal rotation of the boom microphone device. This ball and socket joint means 55 allows the boom microphone device 50 to be pivoted at 360° about the axis of the receiver housing 20, although 180° degrees rotation is illustrated in FIG. 2A. Similarly, the boom microphone device can be pivoted at 360° about the axis of the sleeve 51. The boom microphone 50 is capable of moving perpendicular to the axis of the receiver housing 20 at the point of the joint means 55, or to and from the wearer's mouth when the headset is worn on the wearer's ear as depicted in FIG. 2C.

It will be evident to those skilled in the art that a mere reversal of the relative positions of the various pivotal parts namely, the boom microphone would produce a headset especially applicable to the either ear. Preferably the distance from the mouth to the microphone should be in the range of about ¼ to about 1.0, preferably about ½ to ¾ or less. The most preferred distance of the microphone casing (not shown), from the wearer's mouth is about 10 to 30, preferably about 20 mm to allow proper acoustical transmission. The microphone casing (not shown) preferably has a white or other color-coded dot indicating the voice-side of the microphone which should be adjusted to directly face the mouth.

Close talking into the wind sock protecting the microphone casing of the present invention is helpful for accurate operation. The preferred position of the boom microphone device 50 when worn on the left ear is the wind sock 60 pointing towards the face or positioned in a substantially L-shaped formation parallel to the ground (note the above-mentioned angle towards the microphone end of the boom microphone). Alternatively, when the headset is worn on the right ear, the preferred position of the boom microphone device 50 is with the wind sock 60 pointed towards the face or positioned in a L-shaped formation parallel to the ground (note again the angling of the end of the boom microphone).

FIG. 2C shows the rotation of the pivotal boom microphone 50 parallel to the axis of the housing 20 for use when preferably placed in the stand 40 (not shown) to achieve the optional voice recognition at a distance. The preferred embodiment is when the headset is inserted into the stand 40 as shown in FIG. 1. The preference location of the boom microphone device 50 when the wind sock 60 is positioned upwards at 90° degree parallel to the plane of the stand 40 as shown in FIGS. 1 and 2C. (note yet again the angling of the end of the boom microphone) This positioning allows the opposite side of the microphone to face the wearer allowing a far field speech and sound recording to be transmitted to the preferred directional microphone located in the microphone casing beneath the wind sock 60 and preferably only one microphone is in operation because of a switch system means (not shown).

Figure 3A:
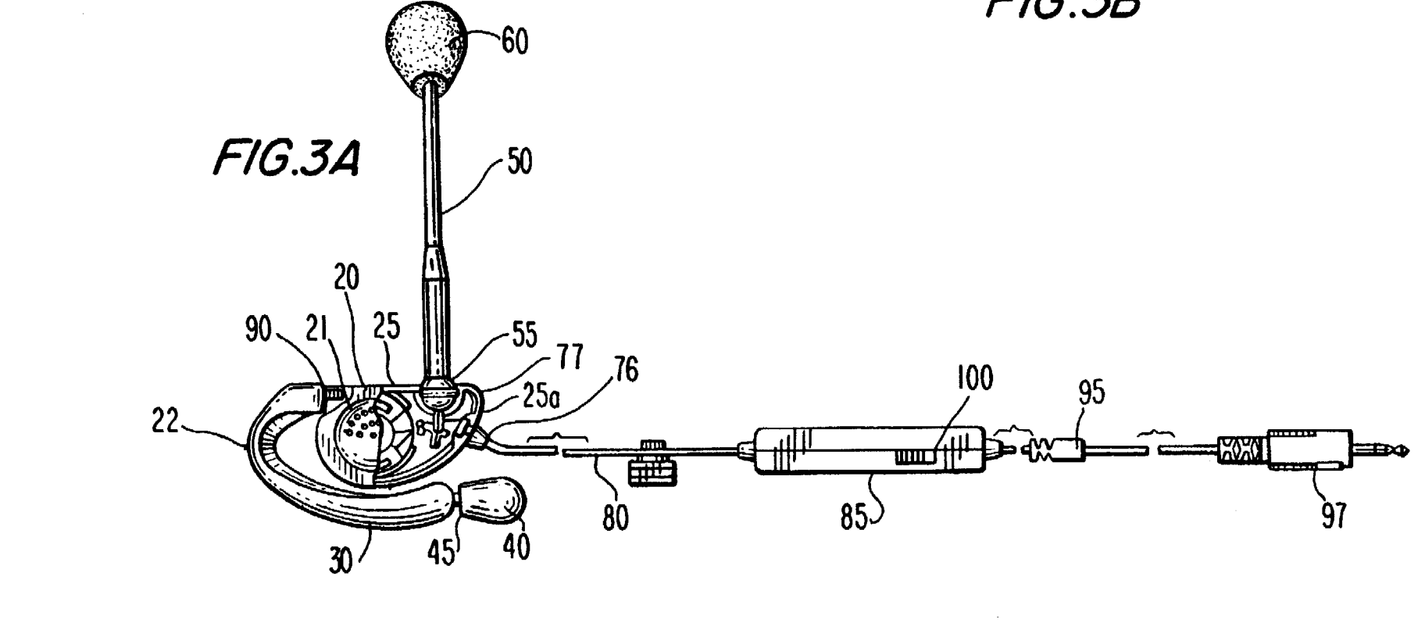
FIG. 3A illustrates a cross sectional view of the noise cancellation headset and FIG. 3B is a top plain view of the noise cancellation handset according to an embodiment of the present invention.
Figure 3B:
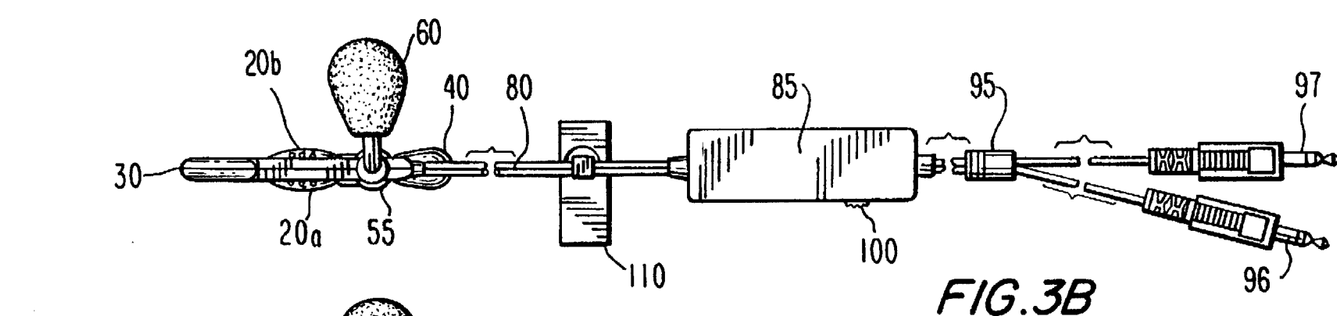

FIGS. 3A and 3B shows plan views comprising the headset components. The housing 20 has a right side 20a and left side 20b shown in FIG. 3B. In FIG. 3A., the housing 20 is comprised of at least one receiver means 21, although more than one receiver means can be utilized such as miniature electromagnetic "button" transducers of the type known for their use in hearing aids. The receiver means 21 converts electric signals received from any multimedia system into sound waves to be conveyed directly into the entrance of the wearer's ear canal by a multiple of acoustical port holes 22 located on both sides of the housing. This further facilitate the reversible hearing of the headset when worn on either ear.

The port holes 22 in the housing covering the other ear allow the audio sound to be transmitted directly to the ear canal of the user's ear without the necessity of an ear tube. Hence, as a result of the housing 20 having a preferred arcuate shaped surface 25a that fits over the wearer's outer ear, no tubular passage for conveying the sound from the receiver or transducer to the ear canal of the wearer is needed. The housing 20 can be shaped as a circle, rectangular, or any like geometric shape which sufficiently covers the outer ear.

The headset cable wiring 80 preferably extends from the lower portion of the arcuate surface 25a of the housing 20. Alternatively, the cable wiring 80 can be passed through the spring means and extend from an opening on any portion of the earband structure 30. The cable wiring 80 leads to an electronic housing or in-line module case 85 to an adapter 95 having two leads 96, 97 respectively, shown in FIG. 3A. Lead 96, the microphone jack depicting the microphone icon is plugged into the "mic in" receiver of any computer sound card. Lead 97 depicting the sound icon is plugged into the "speaker" receiver of any computer sound card. A converter plug (not shown) is plugged into the microphone jack 96 for compatibility with other media cards, e.g., SoundBlaster's computer cards. The headset cable wiring 80 connects the headset 10 to external communication equipment. After the adapter 95 is plugged into the appropriate jacks the switch function 100 on the headset allows the wearer to execute multimedia and speech recognition application, telecommunicate from your home to the office via computer telephone, and use voice commands for interactive games. Accordingly, the adapter 95 has the capability of being plugged into any sound cards of communication networks, like telephone systems, computers, voice recognition monitors, or the like.

The in-line module case 85 has a switch function system 100. This switch function dictates the dual-function of the microphones located in the casing beneath the wind sock 60, which will be discussed later.

The microphone lead wires 77 extend from the microphone casing (not shown) through the boom device 50 to the housing 20, which are attached to the transducer wires 76 to comprise the cable-wiring 80. The cable wiring 80 protrudes from the arcuate surface 25a of the housing 20. The cable wiring 80 depends downwardly and has its weight acting on the housing 20 to provide a clockwise torque. The counter clockwise torque provided by the obliquely extending boom microphone device from the housing 20 and the holding action of the preferred earband member 40 attached to the earband structure 30 serves to overcome the clockwise torque and provides further stability in holding the headset in place.

The boom microphone device 50 extends from the ball and socket joint 55 mounted on the flat surface 25 of the housing 20. The arcuate earband member 30 is comprised of a left member, a right member, a first end, and a second end. The first end of the earband member 30 is mounted by spring means 90 to the top of the flat surface 25 of the housing 20. The spring means 90 provides allows the earband structure 30 with flexibility to move the up and down relative to the housing 20. This flexibility of the headset accommodates different sizes and shapes of the ear, behind the ear lobe and behind the auricle (e.g. behind the fossa of helix and/or anti-helix, and/or over the mastoid bone protruding from the skull behind the ear, i.e., between the back of the ear and the skull) behind the ear. The second end of the earband structure 30 is mounted by a ball and socket joint means 45 at an earband member 40, preferably shaped as a teardrop, as shown in FIGS. 1–3, although any geometric shape can be used.

The earband member 40 has a top surface, a bottom surface, left side and right side. The top surface of the earband member 40 is mounted to the earband structure 30 by the ball and joint socket means 45. This earband member 40 enables the wearer to adjust the member 40 to the appropriate position against the lower back portion of the ear to snugly secure the headset 10 to any size ear lobe. The rotatable adjustment of the earband member 40 is from 0° to 180° to the axis parallel to the plane of the side of the wearer's head or towards and away from the lower portion of the ear lobe.

This earband swivel is pivotal so that a tight fit of the headset to the wearer's ear is achieved as shown in FIG. 2C. Further, the spring means 90 allows the earband member 30 to move up and down or left to right for suitable wearing. The earpiece comprising the earband structure 30 and the earband member 40 is primarily intended for use with one ear only, as shown in FIG. 2B for the right ear.

In FIG. 3A, the housing 20 is comprised of a left arcuate housing 20b and a right arcuate housing 20a having a raised portion protruding from the middle of each arcuate housing (25a, 25b) to form a bubble. At least one receiver means 21 in FIG. 3 is housed beneath the bubble, which was the acoustical port holes 22 on either side of the bubble to provide for reversible wearing. The cable wiring 80 also contains a clothes clip assembly 110 or line cord clip which allows the wearer to fasten the cable wiring onto any item of clothing for easy mobility without the hinderance of being tangled in wires. The wearer is the able to speak into the headset 10 without physically being connected to any communication means, a no chirality headset.

Figure 4A:
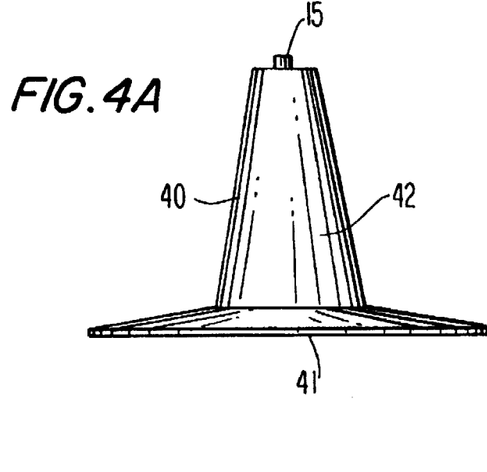
FIGS. 4A, 4B and 4C are side views of the stand for mating with the headset of FIG. 2A.
Figure 4B:
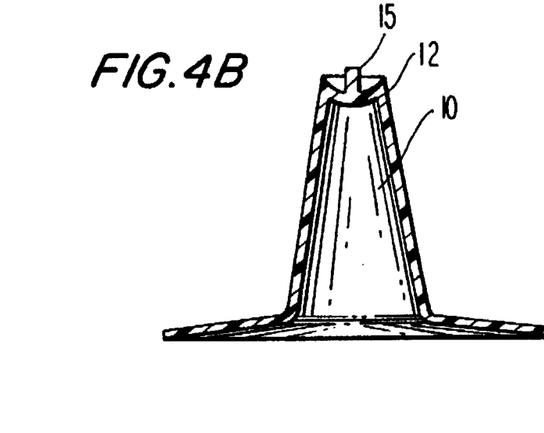
Figure 4C:
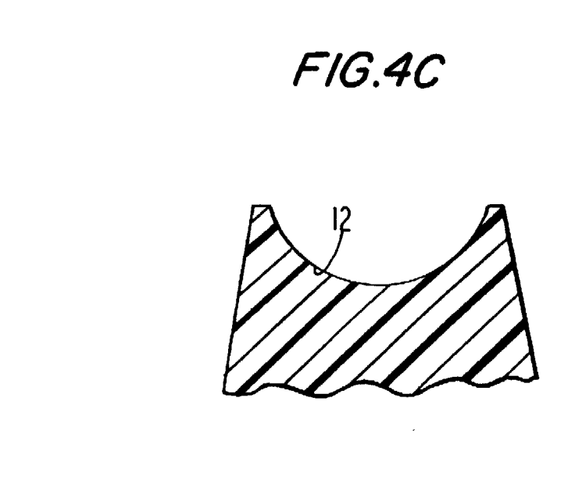

FIG. 4 clearly illustrates the stand 10 with the female member 15 protruding from the cavity of the stand 40. The stand 10 comprises a base 41, an upright member 42, preferably conical shape, although any geometric shape such as a square, rectangular, triangular, or the like would be suitable. The female member 15 such as a raised pin engages in a mating recess with the male member of earband member 40, such as a pinhole to secure the headset 10 to the stand 40. This is accomplished by a female member located on the bottom surface of the earband member 40, which male member 15 is inserted and engages with the female member of the earband member 40 as assembled in FIG. 1. This engagement allows the headset 10 to be supported in the stand 40.

Alternatively, the earband member 40 may contain the male member and the stand 40 comprises the female member to achieve the same engagement of the headset to the stand 40. Another suitable engagement means to secure the headset 10 to the stand 40 may be a hook and loop means, i.e. Velcro or the like. When the headset is engaged into the stand, the headset functions as a stand-alone desk-top microphone system when the switch 100, preferably having a green button, is moved to the "A" position (not shown). This position activates only the "mic" receiver. Preferably, disengaging one of the two microphones shown in FIG. 5 so the dual-function microphone offers a high-fidelity headset for voice dictation; desk-top microphone for far-field speech and sound recording; and more used speech and accurately speech-driven applications.

FIG. 4B shows a side view of the stand 40, where the female member 15 vertically extends from within a carved out portion of the stand 40 or cavity 12 as further shown in FIG. 4C. The cavity 12 provides additional interlocking mechanical stability for the preferred earband member 40 to snap tightly into the stand 40.

Various materials can be used for producing the housing 20, earband structure 30, earband member 40, boom microphone device 50, microphone casing, stand 10 from among various synthetic resins and plastics. The preferred plastic molding material of these components is made of ABS type V, per L-p-1183 have been found to be earnestly satisfactory from the standpoint of weight, appearance, comfort and workability.

Figure 5:
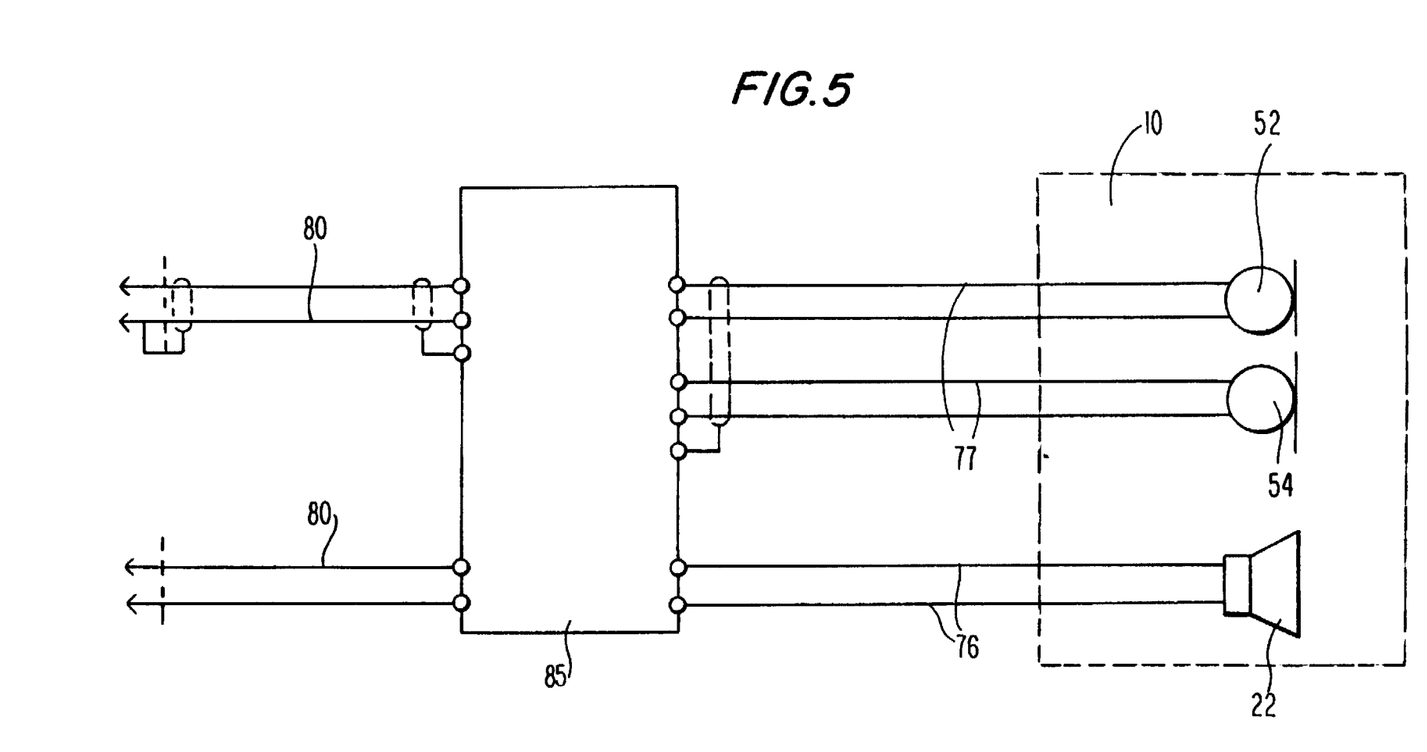
FIG. 5 is a wire diagram of the noise cancellation circuitry for canceling or reducing background acoustic noise in the headset of FIG. 1.

FIG. 5 illustrates the noise cancellation wiring diagram housed within the in-line module 85 preferably for reducing and canceling background noise. As shown therein, the headset 10 generally includes at least one microphone means, preferably a first microphone and second microphones 52 and 54, respectively, and a speaker means or receiver means 22 as in FIG. 5. Each of these components (52, 54, 22) have a positive and negative wire that connects into the in-line module 85, which then takes the signal from the microphones and the audio signal to be transmitted from the speaker means and transmit the signals through the cable wires 80 to the adapter 95, which leads 76–77 plugs into any external communication systems, such as multimedia and speech-recognition applications, computer telephony. Preferably, the adapter plugs into sound cards in the back of a computer system.

Figure 6A:
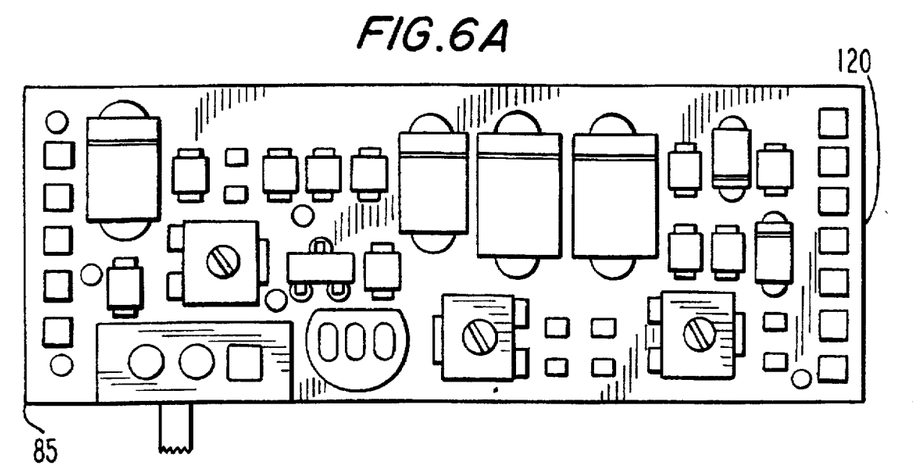
FIG. 6 is a circuit card assembly of the in-line module in FIG. 3A.
Figure 6B:
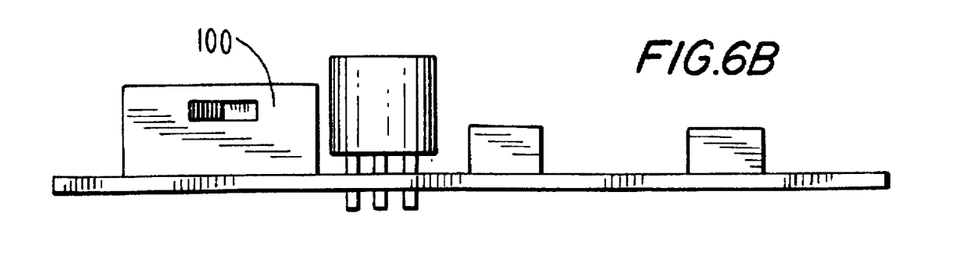

FIG. 6 illustrates the circuit card assembly 120 inside the in-line module case 85, which is shown in FIGS. 3A–3B. The circuit board assembly 120 contains circuitry which, processes the signals from microphone means, preferably the first and second microphones 52 and 54, respectively, for supply to the sound system of the receiver means 22. The circuit card assembly 120 is adapted to receive speech and background noise signals from the first microphone 52 and to subtract from the background noise signal from the second microphone 54 so as to derive a signal which represents substantially speech.

Such signal is supplied to a transmitting device (not shown) so as to be converted to a RF or IR signal and transmitted to a remote receiving device (not shown) by means of the adapter 95 wherein the signal transmitted on cable wiring 80 comprises mostly speech. The preferred first and second microphones 52 and 54, respectively, are held in place preferably by a holding member (not shown) which, for example, may be constructed of a foam-like material. Although the above embodiments have been preferably described as having only one first microphone 52 and one second microphone 54, the invention is not so limited and any number of microphones 52 may be utilized for the first microphone and/or the second microphone. The individual circuit components without reference designations depicted in FIG. 6 is connected as shown and will not be discussed further, since the members and values are apparent to those skilled in the art and are not necessary for an understanding of the present invention.

Figure 7:
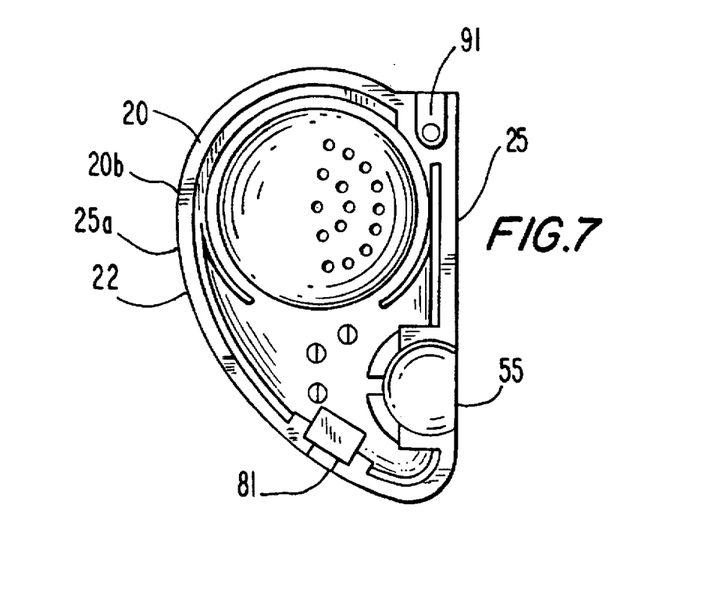
FIG. 7 is a left side view of the arcuate earband of the headset in FIG. 1.

FIG. 7 shows a cross-section view of the left arcuate housing 20b comprising the housing 20. The description provided for the left arcuate housing 20b is the same for the right arcuate housing 20a (not shown). As shown therein, the housing 20 generally includes the left arcuate housing 20b, the right arcuate housing 20a (not shown), a first opening for receiving the spring means 91, a flat surface 25, a second opening being the socket for securing the boom microphone device 50 by the ball and socket joint means 55 and a third opening 81 for the cable wiring 80 outlet.

The ball and joint socket means 55 pivotally connects the second end of the boom microphone device 50 to the housing 20. The preferred first and second microphones 52, 54 are positioned at the distal end or first end of the boom microphone device 50 covered by a preferred protective medium, preferably a wind sock 60 to protect against any possible overdriven sound pressure. The acoustical port holes 22 are shown on the bubble area of the left arcuate housing 20b, with the identical port holes located on the bubble area of the right arcuate housing 20a for reversibility wearing of the housing 20 on the right or left ear of the wearer.

Figures 8A, 8B, 8C:
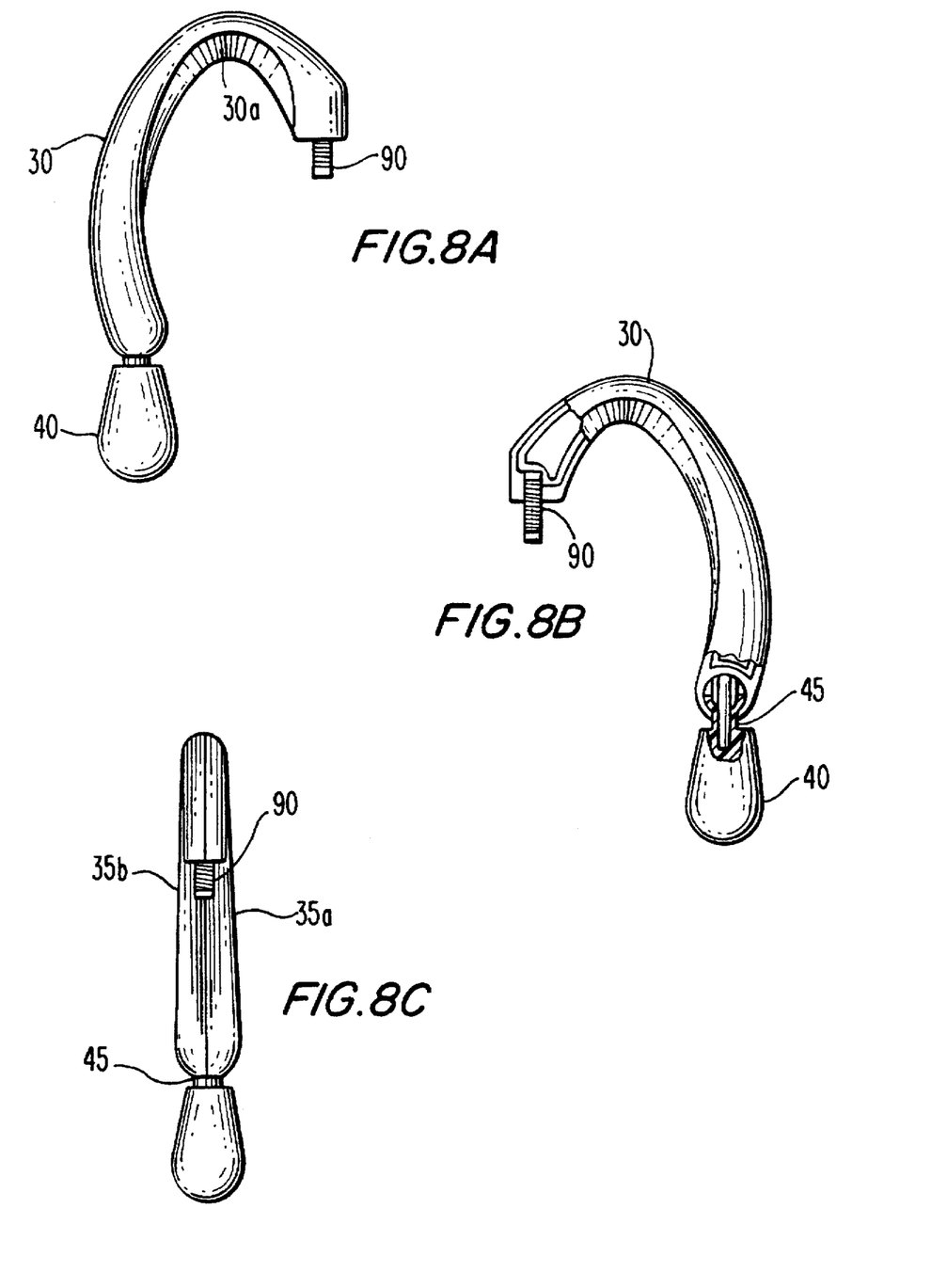
FIGS. 8A, 8B illustrate side views
FIG. 8C illustrates a front view of the arcuate earband having an earband member according to an embodiment of the present invention.

FIGS. 8A–8C illustrate different perspective views of the arcuate earband structure 30, preferably arcuate shaped to adapt itself to the ear of the wearer by clamping itself securely to the auricle (e.g. the fossa of helix and/or antihelix, and/or over the mastoid bone protruding from the skull behind the ear behind the ear, i.e., between the back of the ear and the skull) of the back ear and to the lower portion of the ear or ear lobe preferably by the adjustable earband member 40.

In FIG. 8A, the arcuate shape of the earband member 40 is shown. The inner surface section 30a of the earband member 30 follows the contour of the mastoid bone behind the ear or the back of the auricle and can snugly engage the mastoid bone behind the ear or the back of the auricle. The preferred earband member 40 clamps to the lower portion of the ear lobe to achieve the desired close fit on the ear. As a result, the outer surface section of the earband member 30 is urged closer against the back ear of the wearer, while simultaneously creating a tighter seal of the housing 20 covering the outer entrance of the ear canal. This close fit yields stability so that the wearer can operate the headset without any hindrance or obstruction.

In FIG. 8B, the left side member case and right side member case 35a and 35b, respectively are shown. Once the ball and socket joint means 45 of the preferred earband member 40 and spring means 90 is positioned in either side member 35a or side member 35b, and the remaining side is aligned, the cases 35a, 35b are secured together preferably by cementing. The earband member 45 should be free of any adhesive.

FIG. 8C shows a cross-sectional view of the ball and socket joint means 45 prior to securing the components in place by cementing means or any other suitable fastening means. As shown therein, the earband member 40 is provided with a ball (not shown) accommodated with a socket 45 in the earband structure 30. Alternatively, the ball of the joint means 45 can be part of the earband member 30, while the socket is located in the earband member 40 to achieve the same ball and socket joint for pivotal rotation.

Figure 9:
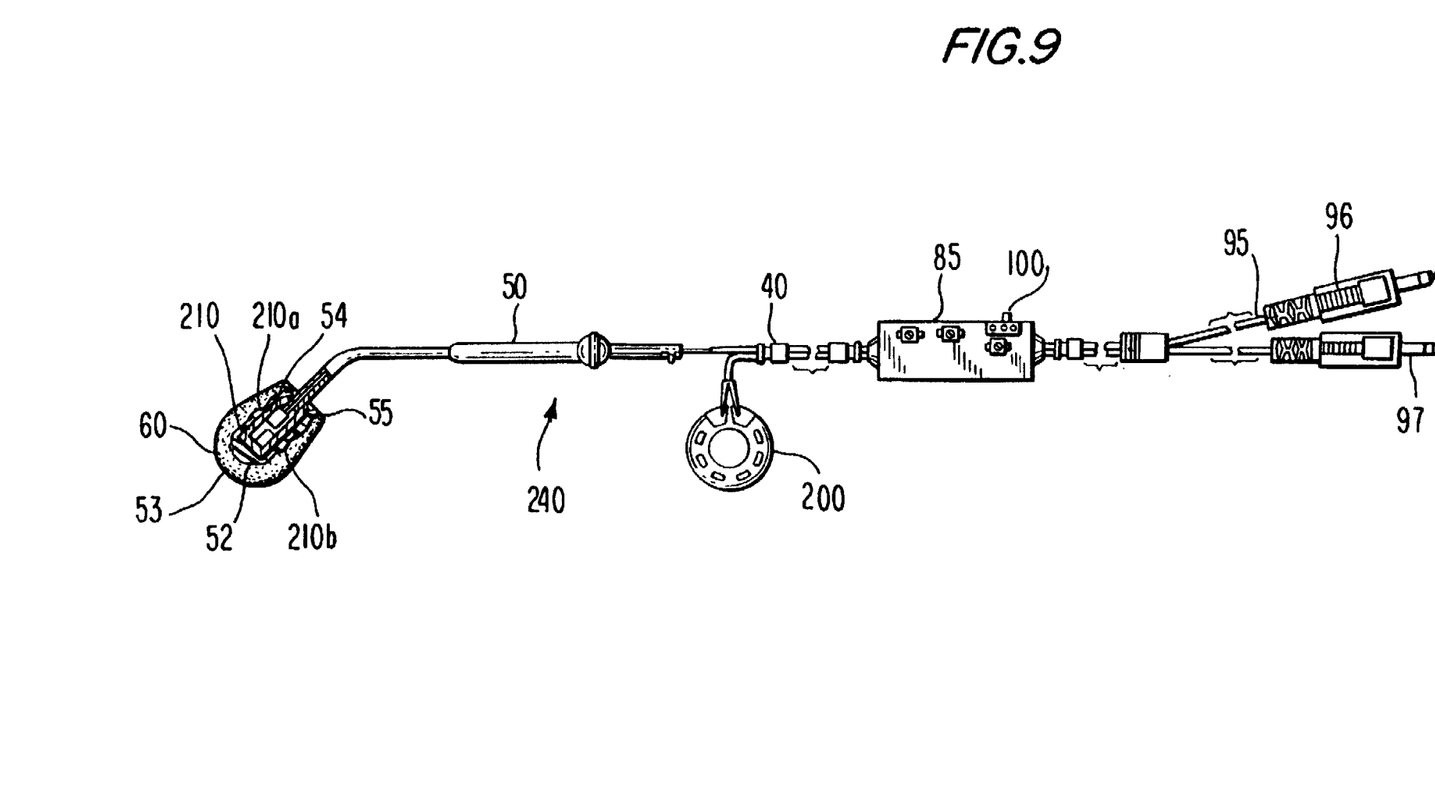
FIG. 9 is a plan view of the in-line module subassembly to which reference will be made in explaining the operation of the present invention.

In FIG. 9 the inside components of the preferred embodiment, a noise cancellation headset, are shown without the outer structures, i.e. housing 20 or earband structure 30. The speaker or transducer means 200 is housed within the housing 20 (not shown). The a microphone boom device 50 is shown having at least one microphone means, preferably the first microphone 52 and a second microphone 54 arranged therein within relatively close proximity to each other. The preferred first microphone and second microphone 52 and 54, respectively are aligned side by side in the microphone casing 210, which is preferably covered by the protective medium or preferably the wind sock 60.

The microphone casing 210 in FIG. 9 comprises an upper microphone case 210a and lower case 210b secured by adhesives means or preferably sonically welded together. The preferred microphone cover or wind sock 60 assists in minimizing acoustic distortions. The microphone casing 210, the speaker 200, the in-line module case 85 with the circuit board assembly (not shown), the boom microphone device 50 having at least a microphones mean, preferably microphones 52 and 54 and the preferred wind sock 60 form the in-line sub assembly 240. The preferred first microphone 52 includes a pressure sensitive surface 53 and the preferred second microphone 54 includes a second pressure sensitive surface 55.

As stated, the preferred first and second microphones 52 and 54 are arranged such that the respective pressure sensitive surfaces 53 and 54 are substantially 180° apart from each other. The preferred microphones 52 and 54 are further arranged so as to have a preferred structural baffle (not shown) between the microphones. Such structural baffle may be comprised of a structural member adapted to provide an acoustical separation between the microphones. Alternatively, an acoustical baffling arrangement could be utilized in place of a structural member. Such baffle is adapted to minimize or prevent any speech from the user from being received by the preferred second microphone 54.

The preferred first and second microphones 52 and 54, respectively, which are preferably electret microphones or similar such microphones. As a result of arranging the first and second microphones as shown in FIG. 9, the first microphone 52 receives both the speech from the transmitter and the background acoustic noise which is present in the vicinity, and the second microphone 54 essentially receives only the same background acoustic noise which is received by the first microphone. The first microphone 52 is adapted to receive acoustical sound such as speech from a wearer and to convert such received acoustical speech into a signal corresponding to such speech. Such first microphone 52 may also receive background noise which may exist.

As is to be appreciated, such background noise is combined with the speech from the operator and, as such, the signal provided by the first microphone corresponds to both the speech from the user and the background noise. On the other hand, the second microphone 54 is arranged within the microphone boom 50 so as to receive primarily only the background noise.

These microphones as stated can be held in place or secured by a preferred holding member (not shown) which, for example, may be constructed of a foam-like material, which, in turn, is secured to the casing 210. The respective outputs from the first and second microphones 52 and 54 are supplied through wire(s) (77) to form the cable wiring 80, which is inserted into the electronic equipment casing 85, wherein the circuit board assembly 120 of FIG. 6 is contained wherein. The circuit card assembly contains circuitry utilized in processing the acoustic signals as described. The cable from the in-line module case 85 is fed then into a grommet 95 for supplying signals to and from the outside or host equipment. The grommet cable running through 95 having two jacks 96 and 97 emerging therefrom. The first jack 97 preferably bearing a sound icon on the outer surface is inserted into the back of the sound card of a computer into the "speaker" receiver. The second jack 96, preferably bearing a microphone icon on the outer surface is inserted into the "mic in" receiver.

Hence, the noise cancellation headset is compatible with major sound cards in any computer system. The in-line module case 85 is comprised of a left case (not shown) and right case (not shown) which can be affixed together after the circuitry is installed, e.g., by snapping together, gluing or soldering. As discussed previously, the switch 100 is housed in the in-line moduling case 85. Preferably a button is installed on the switch, which may be shifted to the left or right. For instance, if the headset is mated into the stand, the switch can be shifted to the left to act as a desk-top microphone system. Similarly, if the headset is worn on the ear, the switch is shifted to the right to act as a anti-noise headset for receiving and transmitting signals.

The switch 100 enables the preferred first and second microphones located at the end of the boom microphone of the headset 10 to act as near field microphones when worn on the ear. This allows the background noise supplied to the first microphone to be subtracted from the speech and noise signal supplied to the second microphone, so that an electric signal representing substantially the speech is transmitted to the desired receiver, telephone, computer, voice recognition system or the like.

When the headset is inserted into the stand or not worn and the ear of the wearer, the wearer shifts switch 100 to the appropriate location, if there is more than one microphone means. Thus the first microphone is turned off and the second microphone performs as a standard far-field bi-directional microphone. It is the function of the switch 100 to dictate the position of the first and second microphones and the function of the signal transmitted. As hereinafter more fully described, the circuit board 120 of FIG. 6 may contain additional circuit elements for processing the signals received from the first and second microphones and for amplifying signals for supply to the speaker 200 in FIG. 9.

Thus, the present invention provides a anti-noise computer headset assembly, having no chirality. The headset of the present invention is adapted is adapted to reduce or eliminate background noise. The preferred embodiment utilizes first and second microphones which act as a dipole arrangement and which may be matched by the manufacturer or by testing after manufacture, have a frequency response which is essentially flat over the anticipated operating range.

By arranging the first and second microphones as previously described, a sound (in particular a background noise) originating from a source which is located at a distance substantially greater than the distance between the microphones, enables the sound from such sound source to be received by both microphones simultaneously. As a result, no substantial phase differential therebetween occurs. Furthermore, the present invention enables the amount of noise cancellation to be adjusted either during the fabrication of the present boom headset assembly or alternatively by an operator utilizing such assembly.

The noise cancellation headset, for instance, of FIGS. 1–10, can be based upon the principles governing the directivity patterns of omni-directional microphones in the near and far fields and the correct placement of the microphone's pressure sensitive surfaces. The physical design of the microphone as seen in FIG. 9 is the determining factor in the S/N increase. Examination of these drawings shows that the microphone pressure sensitive surfaces are preferably placed at 180 mechanical degrees from each other, and provide the optimum separation of the signal going to the voice microphone and noise microphone in the near field. This separation is a primary component in the determination of the signal in the S/N ratio.

The present invention may be used with the noise cancellation system and circuitry as described in U.S. Pat. No. 5,381,473 and the continuation-in-part application Ser. No. 08/339,126 filed on Nov. 14, 1994, both have a common assignee with the present application, and which is hereby incorporated by reference; however, such is not believed necessary to the invention.

The boom microphone headset device of the invention (e.g. FIGS. 1–10) can provide for computer voice recognition. The boom microphone headset provides superior rejection of unwanted background noise and excellent voice response. The boom microphone headset can be configured to be compatible with all IBM and SoundBlaster® audio cards. For SoundBlaster compatibility, a converter plug (not shown) is plugged into the microphone jack 97.

Figure 10:
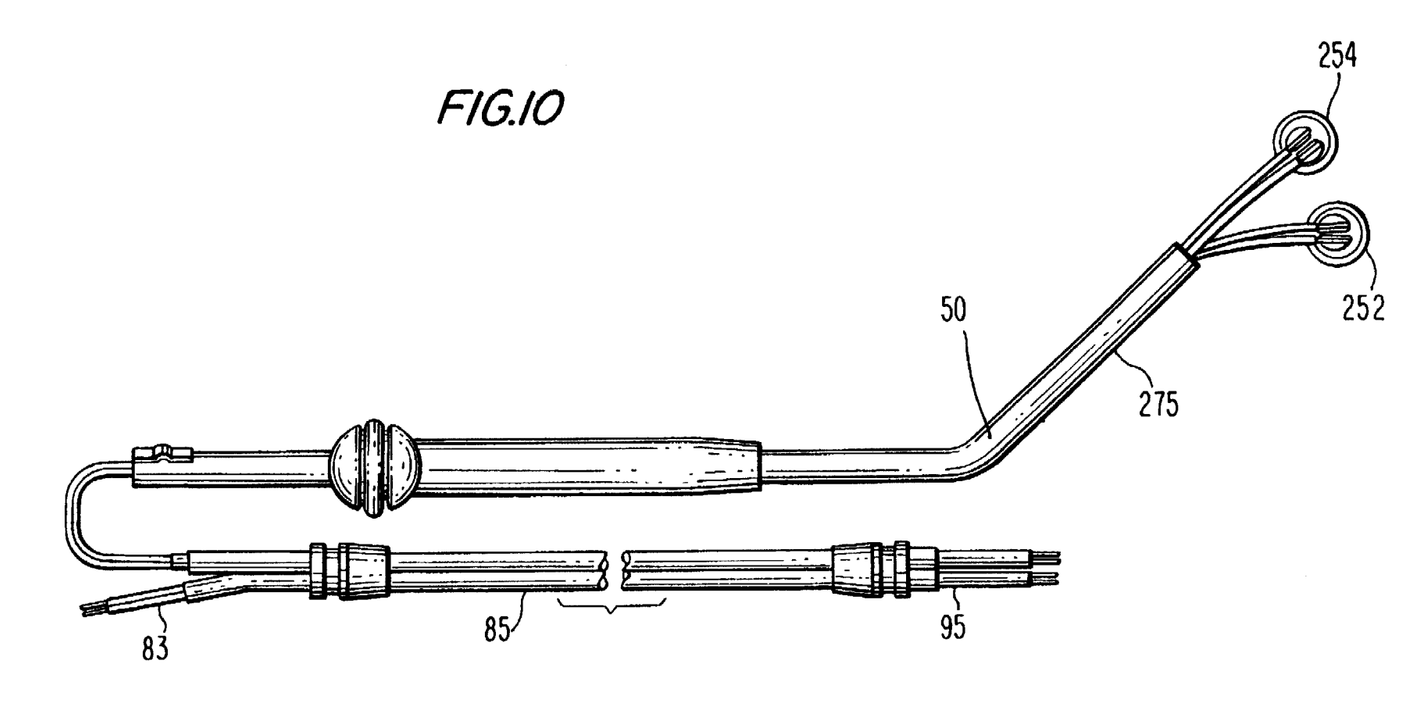
FIG. 10 is a plan view of the microphone boom subassembly of the present invention.

All other audio card interfaces are also easily accommodated as a result of the versatile adapter 95 shown in FIG. 10.

FIG. 10 illustrates the boom microphone subassembly 275. As shown therein, such microphone boom assembly 275 generally includes an electronic connecting means 85, an adapter 95 for plugging into external communication system, electronic wiring 83 for the receiver means, a boom microphone device 50 having at least microphones means arranged as previously discussed. Such microphone boom device 50 includes preferably first and second microphones 252 and 254 which is arranged in a manner as previously described with reference to FIG. 9. Further, such microphone boom assembly 440 includes an upper microphone case 210a, a lower microphone 210b, and at least one microphones, preferably a first and second microphone 50 and 54, and a preferred wind sock 60 as discussed in FIG. 9. The headset preferably is connected to cable preferably of a length of about 2 meters which terminates in a 3.5 mm miniature plug or adapter 95. To connect the adapter 95 to the sound card of any computer, the user simply inserts the miniature plug 95 into the Microphone input jack of the sound card (not shown).

As to use with the SoundBlaster®, it is important to disable Automatic Gain Control (AGC) on the sound card before using the present invention in noise canceling applications. If AGC is ON, it will defeat the noise cancellation properties of the microphone by automatically turning up the input audio volume when the user is not speaking. The AGC can be disabled on Sound Blaster™ cards by running Creative Mixer™ and clicking on the AGC software control under "Recording Settings . . . ". The input audio gain is easily tailored to the target application using the Creative™ Mixer program. Testing of the inventive microphone headset can easily be performed by using the record and playback features of the Creative Labs Wave Studio™ program.

The inventive boom microphone noise cancellation headset (e.g., FIGS. 1–10) coupled with the latest in high quality voice recognition software advances computer control with voice to a reliability and user friendliness level equal to the keyboard and mouse. With the present invention, voice recognition is no longer confined to quiet closed door offices, but can be used in real-world noisy environments such as hotel lobbies, hospital emergency rooms, manufacturing facilities and noisy office areas. Thus, the boom microphone headset interfaces with computers, telephones or other multimedia equipment in the real world or, the boom microphone device can be employed in various voice recognition applications.

The present invention is not so limited and may be used with numerous other intended uses such as for voice dictation, telecommunicate from your home to the office to computer telephony, and to use voice command for interaction games and so forth. Further, the invention can be utilized in voice recognition and/or verification systems such as systems for access to physical facilities, computer programs, computers or automatic teller machines and the like.

The noise cancellation headsets described above is simple in construction, lightweight and easily adjusted, enabling it to be used with maximum convenience and with minimum discomfort and fatigue. Thus, it is seen that the present invention provides a lightweight, ergonomic design headset, which is fully adjustable. Alternatively, the microphone connecting means can be housed in a plug with which the headset is connected to communications apparatus or mounted in the communications apparatus.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A headset comprising:

arcuate housing for placement over a left or right ear of a wearer, said housing having at least one receiver means for transmitting audio signals to the ear;

arcuate earband structure for placement behind the ear having an earband member, the earband member having a female member;

first pivotal means for securing the earband member to the earband structure;

spring means for attaching the earband structure to the housing;

a boom microphone device having two ends, one end having a first microphone means for receiving a first acoustic sound composed of speech originating from the wearer and background noise and for converting said first acoustic sound to a first microphone signal and a second microphone means arranged at a predetermined angle with respect to said first microphone means for receiving a second acoustic sound composed of substantially said background noise and for converting said second acoustic sound to a second microphone signal and the other end having means for connecting the device to the housing;

means for subtracting the second signal from said first signal so as to obtain a signal representing substantially speech;

a second pivotal means for securing the boom microphone device to the housing;

electrical connecting means for transmitting audio signals from and supplying the microphone signal to an external communication system by an adapter means; and a stand having a male member for insertion into the female member of the earband member.

2. The headset according to claim 1, wherein the first pivotal means for securing the boom microphone device to the housing is a ball and socket joint.

3. The headset according to claim 1, wherein the second pivotal means for securing the earband member to the earband structure is a ball and socket joint.

4. The headset according to claim 1, wherein the microphone means is in a casing covered by a protective medium.

5. The noise cancellation headset according to claim 4, wherein the protective medium is a wind sock.

6. The headset according to claim 1, wherein the electronic connecting means is an in-line module case having a switch function.

7. The headset according to claim 1, wherein the adapter means is comprised of at least two jack means for insertion into sound cards of a computer.

8. The headset according to claim 1, wherein the jack means comprise a microphone jack for insertion into a microphone receiver of the sound card and a headset jack for insertion into a speaker receiver of the sound card.

9. The headset according to claim 1, wherein the receiver means has means defining holes for transmitting audio signals through the housing.

10. The headset comprising: arcuate housing placement over an ear, left or right, of a wearer, said housing having at least one receiver means for transmitting audio signals to the ear;

arcuate earband structure for placement behind the ear;

spring means for attaching the earband structure to the housing;

boom microphone device having two ends, one end having a first and second microphone means for receiving an acoustic sound and for converting said acoustic sound to a microphone signal and the other end having a first pivotal means for connecting the device to the housing;

electronic connecting means for transmitting audio signals from the receiver means to the ear and for supplying the microphone signal from the boom microphone device to an external communication system by adapter means;

wherein the arcuate earband structure has two ends, the first end of the earband structure connected to the spring means and the second end of the earband structure opposite the first end connects the earband structure to an earband member by a ball and socket joint; and wherein the first microphone means receives a first acoustic sound composed of speech originating from the wearer and background noise, and for converting said first acoustic sound to a first microphone signal, the second microphone means arranged at a predetermined angle with respect to said first microphone means for receiving a second acoustic sound composed of substantially said background noise and for converting said second acoustic sound to a second microphone signal, and means for subtracting the second microphone signal from said first microphone signal so as to obtain a signal representing substantially the speech, and whereby the headset is a noise cancellation headset.

11. A headset comprising:

arcuate housing for placement over an ear, left or right, of a wearer, said housing having at least one receiver means for transmitting audio signals to the ear;

arcuate earband structure for placement behind the ear having a first end and a second end;

the first end attached by movable means to an earband member;

the earband member having a distal end from attachment to the earband structure;

the distal end having a means for matingly fitting into an upright stand;

the second end having spring means for rotatably attaching the earband structure to the housing thereby allowing the earband structure to rotate up to 360° around the housing;

boom microphone device having a first end and a second end;

the first end having a microphone means for receiving an acoustic sound and for converting said acoustic sound to a microphone signal;

the second end having means for connecting the boom microphone device to the housing; and electronic means for transmitting audio signals from the receiver means to the ear and for supplying the microphone signal from the boom microphone device to an external communication system by adapter means.

12. The headset according to claim 1, wherein the means for connecting the boom microphone device to the housing is a pivotal means.

13. The headset according to claim 12, wherein the pivotal means for connecting the boom microphone device to the housing is a ball and socket joint.

14. The headset according to claim 1, wherein the microphone means is comprised of a first microphone and a second microphone means.

15. The headset according to claim 1, wherein the microphone means is in a casing covered by a protective medium.

16. The headset according to claim 1, wherein the protective medium is a wind sock.

17. The headset according to claim 1, wherein the electronic means is an in-line module case having a switch function.

18. The headset according to claim 17, wherein the adapter means is comprised of at least two jack means for insertion into sound cards of a computer.

19. The headset according to claim 18, wherein the jack means comprises a microphone jack for insertion into a microphone receiver of the sound card and a headset jack for insertion into a speaker receiver of the sound card.

20. The headset according to claim 12 wherein the means for matingly fitting with a stand is a female member.

21. The headset according to claim 20 including a stand wherein the female member of the earband member mates with into the stand having a male member.

22. The headset according to claim 1, wherein the receiver means has means defining holes for transmitting audio signals through the housing.

23. The headset according to claim 1, wherein the first end of the earband structure connects to the earband member by a pivotal means, and the means for matingly fitting with a stand is a female member.

24. The headset according to claim 23, wherein the pivotal means for connecting the earband member to the earband structure is a ball and socket joint.

* * * * *